United States Patent [19]

Dytch

[11] Patent Number: 4,462,540
[45] Date of Patent: Jul. 31, 1984

[54] CONTROL SYSTEM FOR AN AIR TEMPERATURE CHANGING UNIT

[75] Inventor: Anthony Dytch, Wolverhampton, England

[73] Assignee: Allen-Martin Electronics Limited, Wolverhampton, England

[21] Appl. No.: 418,098

[22] Filed: Sep. 14, 1982

[30] Foreign Application Priority Data

Sep. 19, 1981 [GB] United Kingdom ............ 8128380
Oct. 16, 1981 [GB] United Kingdom ............ 8131244

[51] Int. Cl.³ .................................... G05D 23/00
[52] U.S. Cl. ............................ 236/47; 165/11 R; 367/93
[58] Field of Search ............ 236/47, 1 R, 94; 165/11 R; 367/93, 94, 198

[56] References Cited

U.S. PATENT DOCUMENTS 4,060,123 11/1977 Hoffman et al. ............ 165/11
4,223,831 9/1980 Szarka ............ 236/1 R

FOREIGN PATENT DOCUMENTS 1368538 9/1974 United Kingdom .
1517628 7/1978 United Kingdom .

*Primary Examiner*—William E. Wayner

[57] ABSTRACT

An air conditioner control system comprises an air conditioner which includes a heating unit, a cooling unit and an internal thermostat, a switch unit for activating the air conditioner and a sensor unit for controlling operation of the switch unit. The sensor unit includes a sound level detecting circuit and an air temperature level detecting circuit and is positioned so as to sense the sound level and temperature level in the room in which the air conditioner is installed.

In operation, if the sound level rises above a threshold associated with occupancy of the room, the air conditioner is activated and the heating and cooling units are controlled by the internal thermostat. When the sound level falls below the threshold, after a preset period the air conditioner is activated only when the room temperature departs from a temperature range which is preset in the unit.

6 Claims, 4 Drawing Figures

CONTROL SYSTEM FOR AN AIR TEMPERATURE CHANGING UNIT

This invention relates to a control system for an air temperature changing unit.

The term "air temperature changing unit" as used herein is intended to include in its meaning an air heating unit such as a radiator, an air cooling unit, or a combined air heating and air cooling unit.

In presently known control systems for air temperature changing units, the unit is controlled by a clock and also by a room thermostat. Whilst such systems prevent operation of the unit when the air temperature is within a desired range and also at certain times of the day, these systems permit the unit to be operated to maintain the temperature within the desired range when the room in which it is situated is not occupied and so energy is used unnecessarily.

It is an object of this invention to provide a new or improved control sytem for an air temperature changing unit in which the above mentioned problem is overcome.

According to this invention there is provided a control system for an air temperature changing unit comprising sound detecting means, temperature sensing means, and means responsive to the sound detecting means and the temperature sensing means for activating an air temperature changing unit.

This invention will now be described in more detail, by way of example, with reference to the accompanying drawings in which.

Figure 1:
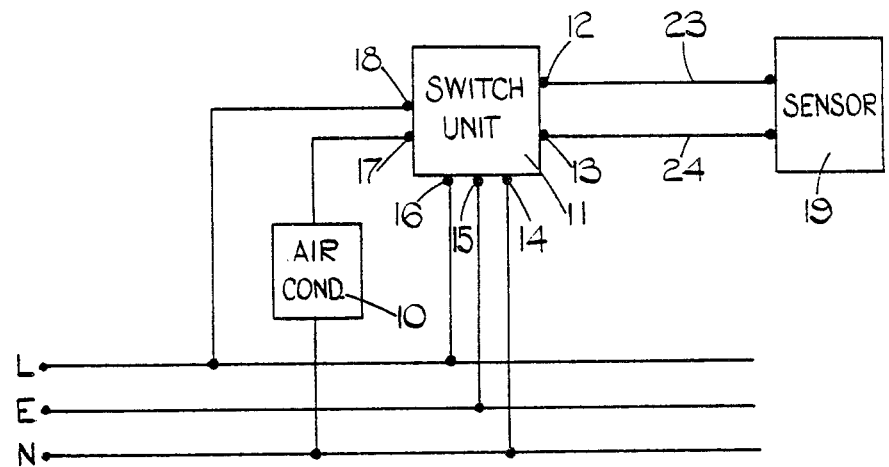
FIG. 1 is a block diagram of an air conditioner control system embodying this invention.

Referring now to FIG. 1, the system there shown is installed in a room in which it is desired to control the air temperature. The system comprises an air conditioner unit 10, a current control unit 11, and a sensor unit 19. The current control unit 11 has input terminals 12 and 13, power input terminals 14, 15 and 16 and output terminals 14, 15 and 16 and output terminals 17 and 18. The air conditioner 10 and the terminals 17 and 18 are connected in series between a mains live terminal L and a mains neutral terminal N. The power input terminals 14 and 16 of the unit 11 are connected respectively to the mains terminal N and the mains terminal L, and the power input terminal 15 is connected to a mains earth terminal E. The input terminals 12 and 13 of the unit 11 are connected to a pair of output terminals 21 and 22 of the sensor unit 19 by a pair of conductors 23 and 24 and the sensor unit 19 is positioned where it can sense both the sound level and the air temperature level of the room. The air conditioner unit 10 comprises an air heating unit, an air cooling unit, and a thermostat positioned to sense the temperature of the room. When the air conditioner unit 10 is activated, if the air temperature falls below a predetermined range the air heating unit is energised and when the temperature rises above a second and higher predetermined value the air cooling unit is energised. The system shown in FIG. 1 would normally be installed in a room subject to variable occupancy.

Figure 2:
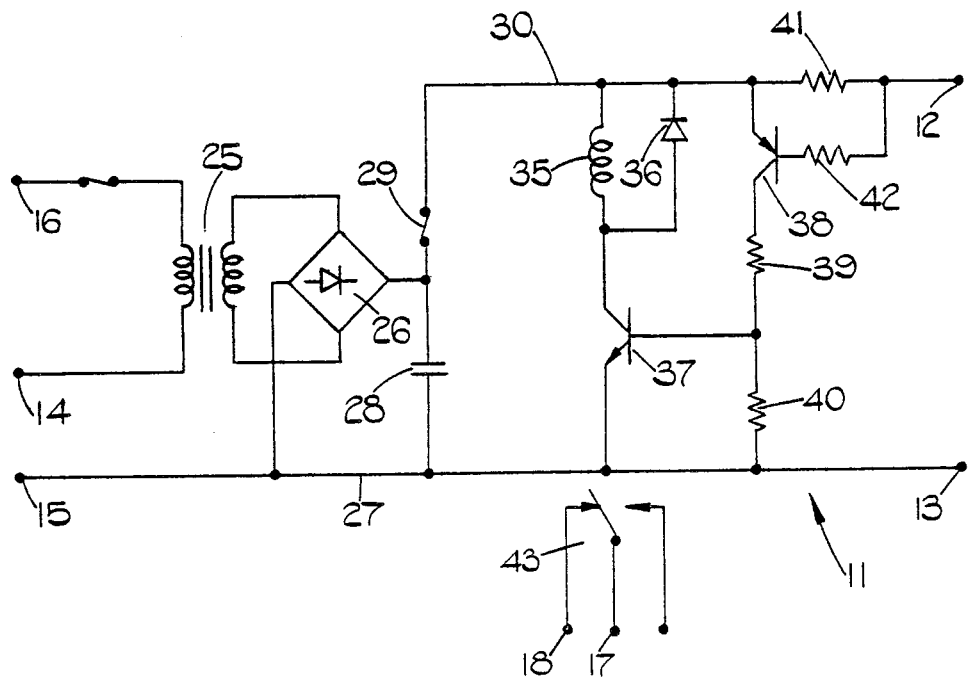
FIG. 2 is a circuit diagram of the current control unit forming part of the system shown in FIG. 1, and FIGS. 3A and 3B form a circuit diagram of the sensor unit forming part of the system shown in FIG. 1.

As shown in FIG. 2 the terminals 14 and 16 of the current control unit are connected across the primary winding of a transformer 25, the secondary winding of which is connected across the input terminals of a full wave rectifier 26. Terminal 15 is connected to an earth rail 27. The negative output terminal of rectifier 26 is connected to the earth rail 27 and the positive output terminal is connected to the earth rail through a smoothing capacitor 28. The positive output terminals also connected through a fuse 29 to a 12 V rail 30.

The 12 V rail 30 is connected through a relay winding 35 bridged by a diode 36 to the collector of an NPN transistor 37, the emitter of which is connected to the earth rail 27. The 12 V rail is also connected to the emitter of a PNP transistor 38, the collector of which is connected through a resistor 39 and a resistor 40 to the rail 27, the junction of resistors 39 and 40 being connected to the base of transistor 37. The rail 30 is connected through a resistor 41 to terminal 12 and terminal 12 is connected through a resistor 42 to the base of transistor 38. The relay coil 35 controls a set of normally closed relay contacts 43. The contacts 43 are connected to the terminals 17 and 18.

Figure 3A:
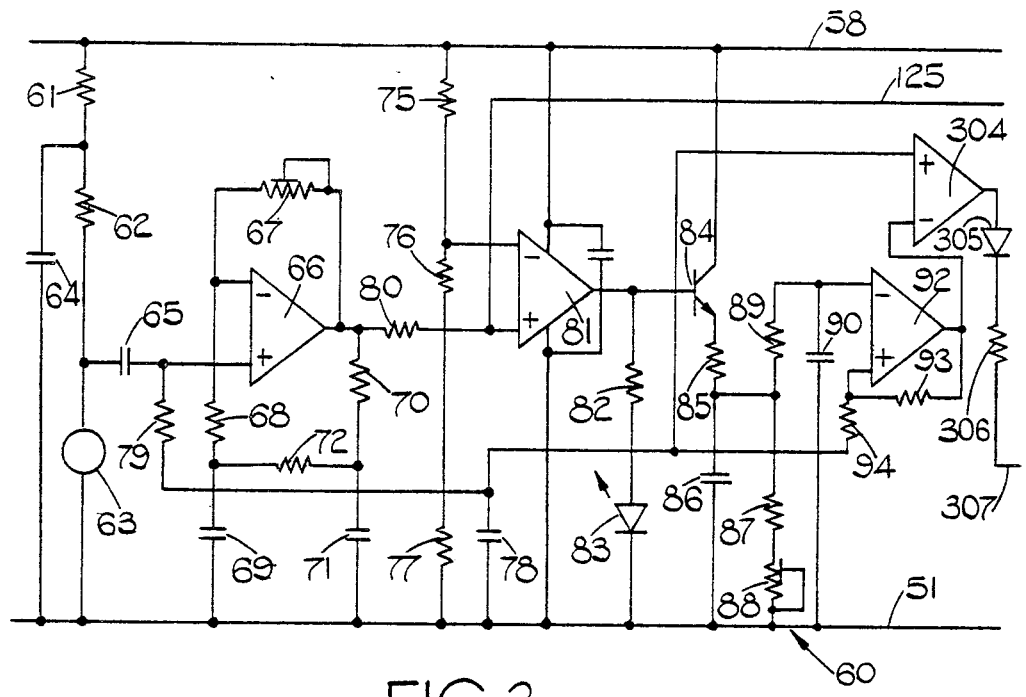
Figure 3B:
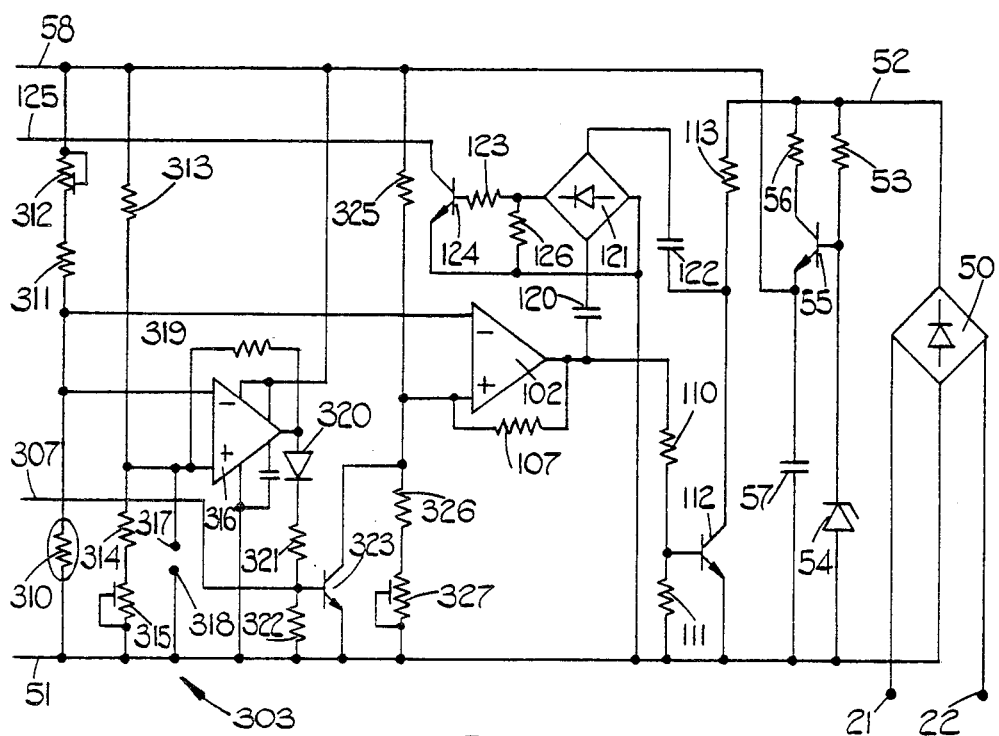

Referring now to FIGS. 3A and 3B, the terminals 21 and 22 are connected to the input terminals of a full wave rectifier 50, which is provided as a polarity corrector, and the negative output terminal of which is connected to a 0 V rail 51 and the positive output terminal of which is connected to a 12 V rail 52. The 12 V rail 52 is connected through a resistor 53 to the cathode of a 5.6 V zener diode 54, the anode of which is connected to rail 51. The cathode of zener diode 54 is connected to the base of an NPN transistor 55, the collector of which is connected through a resistor 56 to rail 52 and the emitter of which is connected through a smoothing capacitor 57 to rail 51. The emitter of transistor 55 is also connected to a 5 V rail 58.

The sensor unit 19 includes sound level detecting means 60 comprising a pair of resistors 61 and 62 and a microphone 63 connected in series between the rail 58 and the 0 V rail 51. The resistor 62 and microphone 63 are bridged by a capacitor 64. The junction of resistor 62 and microphone 63 is connected through a capacitor 65 to the non-inverting input of an operational amplifier 66, the output of which is connected through a variable resistor 67, a resistor 68 and a capacitor 69 to rail 51. The junction of resistors 67 and 68 is connected to the inverting input of amplifier 66. The output of amplifier 66 is connected through a resistor 70 and a capacitor 71 to rail 51, and the junction of resistor 70 and capacitor 71 is connected through a resistor 72 to the junction of the junction of resistor 68 and capacitor 69. There is also provided a potential divider comprising three resistors 75, 76 and 77 connected in series between rails 58 and 51. Resistor 77 is bridged by a capacitor 78 and the junction of resistors 76 and 77 is connected through a resistor 79 to the non-inverting input of an amplifier 66. In operation, amplifier 66 together with the associated resistors and capacitors functions as an AC amplifier the gain of which may be adjusted by the variable resistor 67. The resistors and capacitors associated with amplifier 66 are selected and arranged so as to give attenuation at both low and high frequencies so that the device is insensitive to low frequency sounds such as passing vehicles and high frequency sounds above the audio frequency band.

The output of amplifier 66 is connected through a resistor 80 to the non-inverting input of an operational amplifier 81. The inverting input of amplifier 81 is connected to the junction of resistors 75 and 76. The output of amplifier 81 is connected through a resistor 82 to the anode of a light emitting diode 83, the cathode of which is connected to the rail 51. In operation, when the room is occupied so that the sound level detected by the microphone 63 exceeds a predetermined level which may be set by adjusting resistor 67, a signal is provided at the output of amplifier 81 thereby energising the light emitting diode 83 which operates as a sound level indicator, The output of amplifier 81 is also connected to the base of an NPN transistor 84, the collector of which is connected to rail 58 and the emitter of which is connected through a resistor 85 and a capacitor 86 to rail 51. The capacitor 86 is bridged by a resistor 87 and a variable resistor 88. The junction of resistor 85 and capacitor 86 is connected through a resistor 89 and a capacitor 90 to the earth rail 51, and the junction of resistor 89 and capacitor 90 is connected to the inverting input of an operational amplifier 92. The output of amplifier 92 is connected through a positive feedback resistor 93 to its non-inverting input, and the non-inverting input is connected through a resistor 94 to the junction of resistors 76 and 77. The output of amplifier 92 is connected to the inverting input of an operational amplifier 304, the non-inverting input of which is connected to the junction of resistors 76 and 77. The output of amplifier 304 is connected to the anode of a diode 305, the cathode of which is connected through a resistor 306 to a rail 307.

In operation, when an output signal is provided by amplifier 81, capacitor 86 is charged through resistor 85. When capacitor 86 charges, after a delay determined by resistor 89 and capacitor 90, the output of amplifier 92 goes low thereby providing a high signal on amplifier 307. When amplifier 81 ceases to produce an output signal, the output of amplifier 92 goes high after a delay determined by capacitors 86 and 90 and resistors 87 and 88. Resistor 88 may be adjusted so that the duration of this delay lies within the range of 15 seconds to 5 minutes. The resistors 89 and capacitor 90 are selected so that they have a time constant of approximately 150 mS.

The unit 19 includes temperature sensing means 303 which comprises a negative temperature coefficient resistor 310, a resistor 311, and a variable resistor 312 connected in series between rails 58 and 51. The junction of resistors 310 and 311 is connected to the inverting input of an operational amplifier 102. The temperature sensing means 303 further comprises a resistor 313, a resistor 314, and a variable resistor 315 connected in series between rails 58 and 51. The junction of resistors 313 and 314 is connected to the non-inverting input of an operational amplifier 316, the inverting input of which is connected to the junction of resistors 311 and 310. Each of the amplifiers 66, 81, 92, 304 comprises one quarter of a type LM324 operational amplifier and amplifiers 316 and 102 each comprise one half a LM358 operational amplifier. The non-inverting input of amplifier 316 is also connected to a terminal 317 which is associated with a further terminal 318 connected to rail 51. As will be described below, terminals 317 and 318 may be connected by a removable link. The output of amplifier 316 is connected through a resistor 319 to its non-inverting input to provide hysteresis. The output of amplifier 316 is connected to the anode of a diode 320, the cathode of which is connected through a pair of resistors 321 and 322 to rail 51. The junction of resistors 321 and 322 is connected to rail 307 and also to the base of an NPN transistor 323, the emitter of which is connected to rail 51. The temperature sensing means 303 also includes a resistor 325, a further resistor 326 and a variable resistor 327 connected in series between rails 58 and 51, the junction of resistors 325 and 326 being connected to the collector of transistor 323 and also to the non-inverting input of amplifier 102.

The resistors 315 and 327 are both associated with temperature scales and, in use, the resistors 315 and 327 and adjusted respectively to correspond to the maximum and minmimum acceptable temperatures of the room when it is unoccupied. The resistor 312 is provided for calibration.

The output of amplifier 102 is connected through a resistor 107 to its non-inverting unit and through a resistor 110 and a further resistor 111 to rail 51, and the junction of these two resistors is connected to the base of an NPN transistor 112. The emitter of transistor 112 is connected to the rail 51 and its collector is connected through a resistor 113 to rail 52.

When a high signal is present at the output of amplifier 102, transistor 112 turns on thereby conducting current through resistor 113. This current is sensed by resistor 41 in the current control unit 11 and causes transistor 38 to turn on thereby turning on transistor 37 and energising relay coil 35 and opening relay contacts 43. When a low signal is present at the output of amplifier 102, transistor 112 is off and consequently transistors 38 and 37 are off and contacts 43 are closed.

As may be appreciated, transistor 112 and its associated components operate as a signalling means whilst transistor 38 and resistor 41 operate as a receiving means. This arrangement enables the sensor unit 19 to be positioned remotely from the current control unit 11.

In operation, when the room is occupied so that the sound level is sufficient for amplifier 81 to produce an output signal, rail 307 goes high thereby turning on transistor 323 and causing the output of amplifier 102 to go low. Consequently, the air conditioning unit 10 is activated and the heating and cooling units are controlled by its internal thermostat. When the room is unoccupied, the output of amplifier 304 goes low thereby removing the high signal from rail 307. In these circumstances, if the room temperature rises above the maximum temperature as set by resistor 315, the output of amplifier 316 goes high thereby switching on transistor 323 and causing the output of amplifier 102, to go low. Consequently, the air conditioning unit 300 is activated. As the resistor 315 should be set to a temperature which exceeds the maximum temperature of the internal thermostat of the air conditioning unit 10, this will result in the cooling unit being energised. If the room temperature falls below the minimum temperature as set on resistor 327, amplifier 102 will again go low thereby activating the air conditioner unit 10. As the minimum temperature as set on resistor 327 should be lower than that of the minimum temperature of the internal thermostat of the air conditioning unit 10, this will result in the heating unit being energised.

Thus, with the system of the present invention, when a room is occupied, the temperature of the room will be controlled in accordance with the internal thermostat of the air conditioning unit 10 and, when the room is unoccupied, the temperature of the room will be controlled in accordance with the temperatures as set on resistors 315 and 327.

Referring again to FIG. 3B, the output of amplifier 102 is connected through a capacitor 120 to one input terminal of a full wave rectifier 121. The collector of transistor 112 is connected through a further capacitor 122 to the other input terminal of this rectifier. The negative output terminal of rectifier 121 is connected to the earth rail 51, and its positive output terminal is connected to the rail 51 through a resistor 126 and to the base of an NPN transistor 124 through a resistor 123. The emitter of transistor 124 is connected to rail 51 and its collector is connected through a rail 125 to the non-inverting input of amplifier 81.

The rectifier 121 and transistor 124 and associated components functions as blocking means for the sound level detecting means 60 as will now be described. Each time the output of amplifier 102 changes state, a high signal pulse will be provided to the base of transistor 124 thereby turning on this transistor for a short period and so preventing the output signal of amplifier 66 from reaching the non-inverting input terminal of amplifier 81. The blocking means is provided so that the click caused by operation of relay contacts 43 does not cause the output of amplifier 81 to go high or capacitor 86 to charge. Without this blocking means with the room unoccupied each time the desired temperature was reached, there would be a danger that the operation of relay contacts 43 would cause capacitor 86 to charge resulting in re-activation of the air conditioner unit 10. Also, with the room unoccupied, there would be a danger that the noise caused by operation of relay contacts 43 after the room temperature had fallen below the predetermined value would cause capacitor 86 to charge with the result that unit 10 would be energised for the full delay period determined by capacitors 86 and 90 and resistors 87 and 88. This delay period might well be longer than the period necessary for the room temperature to rise again to the desired level. Also without the blocking means, when a room became unoccupied there would be a danger that the noise caused by operation of relay contacts 43 would cause re-energisation of unit 10.

The reason for providing resistor 89 and capacitor 90 will be explained. When a room is initially occupied, capacitor 86 is quickly charged by resistor 85 and the voltage developed across resistor 86 is applied to the non-inverting input of amplifier 92 after a short delay determined by resistor 89 and capacitor 90. The output of amplifier 92 goes low thereby causing the output of amplifier 102 to go low and so the signal applied to the non-inverting input of amplifier 81 is removed for a short period as determined by the blocking means. During this period, the capacitor 86 discharges. In the absence of resistor 89 and capacitor 90, this could cause the output of amplifier 92 to go high again. However, resistor 89 and capacitor 90 ensure that capacitor 86 is sufficiently charged to prevent this happening by the time the output of amplifier 92 goes low.

If it is desired to use the circuit shown in FIGS. 3A and 3B to control only a heating unit, terminal 317 and 318 are joined by the removable link. Alternatively, amplifier 316 and transistor 323 and their associated components may be omitted. When the circuit is used with only a heating unit, the heating unit will maintain the air temperature above a first predetermined value when the room is unoccupied and above a second higher predetermined value when the room is occupied.

A heating unit controlled by the circuit of FIGS. 2 and 3 may take the form of an electrical heating element directly operated by relay contacts 43 or a radiator in which the rate of heat output is controlled by a fan. In this latter case the fan is operated by contacts 43.

It is to be appreciated that the system of the present invention with suitable modification could also be used with an air conditioner unit which comprises solely an air cooling unit. In such circumstances, the air conditioner unit would maintain the room temperature below a first predetermined value when the room is occupied and below a second higher predetermined value when the room is unoccupied.

If it is desired to increase the accuracy of the temperature setting, resistor chains 313 to 315 and 325 to 327 may each be replaced by an operational amplifier to provide the respective reference voltages. Each amplifier has four resistors connected in parallel connected to its inverting input and each resistor is connected in series with a switch for setting the temperature.

When the arrangement shown in FIGS. 3A and 3B is used to control only a heating unit, the circuit may be modified so that the amplifier 316 controls room temperature when the room is occupied. In this case, a separate room thermostat is not used.

In another modification to the arrangement of FIGS. 1 to 3, a separate signal line is provided between the sensor 19 and the switch unit 11 and so the transistor 38 may be eliminated.

I claim:

1. A control system for an air temperature changing unit comprising sound detecting means, temperature sensing means, means for activating an air temperature changing unit, said activating means comprising signalling means responsive to the sound detecting means and the temperature sensing means for generating a control signal and relay contacts responsive to the control signal for activating the air temperature changing unit, and means for blocking the sound detecting means for a short period each time said control signal changes state.

2. A system as claimed in claim 1 in which the activating means activates the air temperature changing unit when either the sound level rises above a predetermined sound level or the temperature departs from a predetermined temperature range.

3. A system as claimed in claim 2 further including delay means for maintaining activation of the heating unit for a predetermined period after the sound level has fallen below the predetermined sound level.

4. A system as claimed in claim 2 or claim 3 further including means for preventing activation of the air temperature changing unit if the temperature lies within a second predetermined range, said second predetermined range falling with said first predetermined range.

5. A system as claimed in claim 4 in which the preventing means comprises a room thermostat which is separate from the temperature sensing means.

6. A system as claimed in claim 1 in which the actuating means further includes receiver means responsive to the control signal from the signalling means for controlling the relay contacts, the sound detecting means and signalling means being formed as one single unit and the receiver means and the relay contacts being formed as another single unit.

* * * * *